US012609117B2

(12) United States Patent
Yae

(10) Patent No.: US 12,609,117 B2
(45) Date of Patent: Apr. 21, 2026

(54) APPARATUS AND METHOD FOR SPEECH RECOGNITION USING USER PROMPT

(71) Applicants: HYUNDAI MOTOR COMPANY, Seoul (KR); KIA CORPORATION, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 215 days.

(21) Appl. No.: 18/392,813

(22) Filed: Dec. 21, 2023

(65) Prior Publication Data

US 2025/0029604 A1 Jan. 23, 2025

(30) Foreign Application Priority Data

Jul. 19, 2023 (KR) ........................ 10-2023-0093884

(51) Int. Cl.
*G10L 15/22* (2006.01)
*G10L 21/0272* (2013.01)
*G10L 25/78* (2013.01)

(52) U.S. Cl.
CPC .......... *G10L 15/22* (2013.01); *G10L 21/0272* (2013.01); *G10L 25/78* (2013.01); *G10L 2015/225* (2013.01)

(58) Field of Classification Search
CPC ..... G10L 15/22; G10L 21/0272; G10L 21/02; G10L 15/04; G10L 2015/221
See application file for complete search history.

(56) References Cited

U.S. PATENT DOCUMENTS

| | | | | |
|---|---|---|---|---|
| 6,246,986 B1 * | 6/2001 | Ammicht | ................ | G10L 15/22 |
| | | | | 704/E15.04 |
| 9,530,432 B2 * | 12/2016 | Herbig | .................... | G10L 25/78 |
| 11,043,214 B1 * | 6/2021 | Hedayatnia | ............ | G06N 20/10 |
| 11,579,841 B1 * | 2/2023 | Eich | ........................ | G06F 9/4881 |
| 11,646,035 B1 * | 5/2023 | Fan | .......................... | G10L 15/32 |
| | | | | 704/270.1 |
| 11,721,330 B1 * | 8/2023 | Pandey | .................. | G10L 15/32 |
| | | | | 704/275 |
| 11,792,570 B1 * | 10/2023 | Govindaraju | ............ | H04R 5/04 |
| | | | | 381/94.1 |
| 2009/0271189 A1 * | 10/2009 | Agapi | ..................... | G10L 15/01 |
| | | | | 704/E15.001 |

(Continued)

*Primary Examiner* — Michael N Opsasnick

(74) *Attorney, Agent, or Firm* — Lempia Summerfield Katz LLC

(57) ABSTRACT

An apparatus for speech recognition includes a user prompt playback unit configured to change a user prompt that induces utterance for speech recognition into a sound source and to play the sound source. The apparatus further includes a microphone detection signal extraction unit configured to extract a microphone detection signal when a user's speech is received as a speech signal through a microphone. The apparatus also includes a user prompt removal unit configured to remove the user prompt from the microphone detection signal. The apparatus further includes a speech recognition unit configured to recognize a speech based on a value from which the user prompt is removed. The apparatus also includes a response output unit configured to output a response related to the speech based on a result of recognizing the speech.

11 Claims, 4 Drawing Sheets

(56)　　　　　　References Cited

U.S. PATENT DOCUMENTS

| | | | |
|---|---|---|---|
| 2016/0111088 A1* | 4/2016 | Park | G01C 21/3608 |
| | | | 704/275 |
| 2020/0057487 A1* | 2/2020 | Sicconi | G06F 3/011 |
| 2021/0375272 A1* | 12/2021 | Madwed | G06F 3/167 |
| 2022/0093101 A1* | 3/2022 | Krishnan | G06V 40/20 |
| 2022/0188361 A1* | 6/2022 | Botros | G02B 27/01 |
| 2024/0095987 A1* | 3/2024 | Piramuthu | G06F 40/279 |
| 2024/0412728 A1* | 12/2024 | Peterson | G10L 15/22 |
| 2025/0029604 A1* | 1/2025 | Yae | G10L 25/78 |
| 2025/0087208 A1* | 3/2025 | Lee | G10L 15/1822 |
| 2025/0095645 A1* | 3/2025 | Lee | G10L 15/26 |
| 2025/0124915 A1* | 4/2025 | Chun | G10L 15/065 |
| 2025/0200293 A1* | 6/2025 | Liu | G06F 40/35 |

* cited by examiner

*101* — USER PROMPT PLAYBACK UNIT

*102* — MICROPHONE DETECTION SIGNAL EXTRACTION UNIT

*103* — USER PROMPT REMOVAL UNIT

*104* — VOICE RECOGNITION UNIT

*105* — RESPONSE OUTPUT UNIT

*106* — CONTROLLER

APPARATUS AND METHOD FOR SPEECH RECOGNITION USING USER PROMPT

CROSS-REFERENCE TO RELATED APPLICATION

The present application claims priority to Patent Application No. 10-2023-0093884, filed in the Korean Intellectual Property Office on Jul. 19, 2023, the entire contents of which are incorporated herein by reference.

TECHNICAL FIELD

The present disclosure relates to an apparatus and a method for speech recognition.

BACKGROUND

The content described below provides background information related to the present embodiment and does not constitute prior art.

Generally, when speech recognition begins by a speech apparatus in response to a person's, i.e., a speaker's request in a vehicle, all sounds in the vehicle are muted and silence builds up in the vehicle. If there are other passengers in the vehicle, they may look at the speaker and listen to the speaker's speech. Most passengers including the speaker may find this situation uncomfortable.

The speaker may feel uncomfortable or anxious about speaking and may be wondering: "What should I do if my speech is not recognized while driving?" Therefore, the time the speaker spends talking to the speech apparatus may be reduced. Further, instructions may be spoken awkwardly by the speaker, resulting in a low recognition rate. As a result, the speaker may stop using speech recognition technology in vehicles and technologies developed at considerable costs may lie idle.

In addition, there are other factors that make it difficult to use existing speech recognition technology. However, there is a lack of development to improve the speech recognition experience. Only new technologies are developed competitively based on the people who use speech recognition rather than using existing technologies. Ultimately, in order to have good speech recognition performance, a large volume of data relating to the users' speech needs to be collected. However, if the number of customers who do not use the technologies increases, the newly created functions may not reflect various speech patterns and performance may eventually reach a threshold limit.

SUMMARY

In view of the above, the present disclosure provides an apparatus and a method for speech recognition based on tastes and preferences of the users.

The present disclosure provides an apparatus and a method for providing a user-friendly speaking environment.

The problems to be solved by the present disclosure are not limited to the problems mentioned above. Other problems not mentioned herein should be more clearly understood by those of ordinary skill in the art from the description below.

According to an embodiment of the present disclosure, an apparatus for speech recognition includes a user prompt playback unit configured to change a user prompt that induces utterance for speech recognition into a sound source and play the sound source. The apparatus further includes a microphone detection signal extraction unit configured to extract a microphone detection signal when a speech of a user is received as a speech signal through a microphone. The apparatus also includes a user prompt removal unit configured to remove the user prompt from the microphone detection signal. The apparatus further includes a speech recognition unit configured to recognize a speech based on a value from which the user prompt is removed. The apparatus also includes a response output unit configured to output a response related to the speech based on a result of recognizing the speech.

According to an embodiment of the present disclosure, a method for speech recognition includes changing a user prompt that induces utterance for speech recognition into a sound source and playing the sound source. The method further includes extracting a microphone detection signal when a speech of a user is received as a speech signal through a microphone. The method also includes removing the user prompt from the microphone detection signal. The method further includes recognizing a speech based on a value from which the user prompt is removed. The method also includes outputting a response related to the speech based on a result of recognizing the speech.

The present disclosure may improve existing stiff, e.g., inflexible, speech recognition experiences or speech recognition that customers find awkward and uncomfortable.

The present disclosure may provide an experience that may reduce the user's resistance to speech recognition by adding the preferences of the user to the beginning and end of the speech recognition (recognition results).

In the present disclosure, various speech patterns may be collected via expanding the user experience, which may result in an efficacious development cycle in which speech recognition performance improves.

The present disclosure may provide a faster speech recognition service by reducing unnecessary waiting time.

The features of the present disclosure are not limited to the features mentioned above. Other features not mentioned should be more clearly understood by those of ordinary skill in the art from the description below.

DETAILED DESCRIPTION

Figure 1:
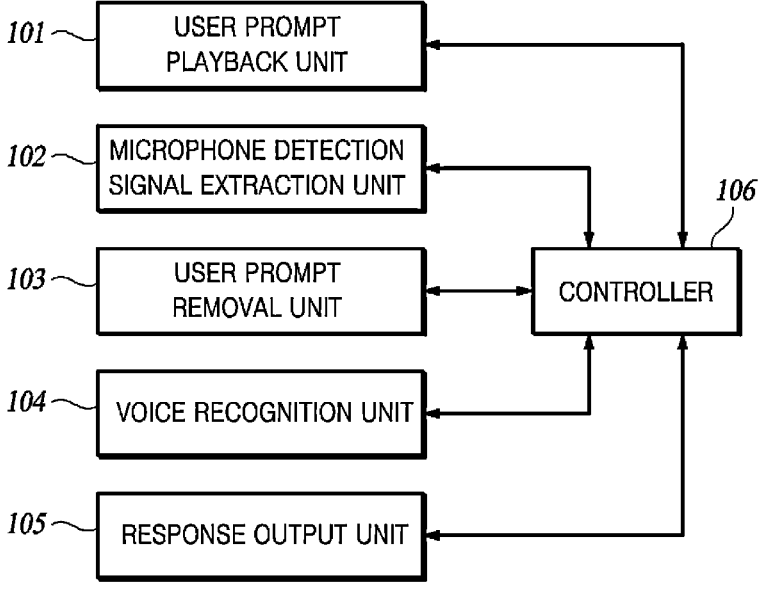
FIG. 1 is a block diagram of an apparatus for speech recognition according to an embodiment of the present disclosure.

Hereinafter, various embodiments of the present disclosure are described in detail with reference to the accompanying drawings. In the following description, like reference numerals refer to like elements even though the elements are shown in different drawings. Further, in the following description of the embodiments, a detailed description of known functions and configurations incorporated therein have been omitted for the purpose of clarity and for brevity.

In addition, terms such as first, second, A, B, (a), (b) may be used to describe components of the present disclosure. These terms are intended only to distinguish one component from another, and the nature, sequence, or order of the components is not limited by the terms. Throughout the specification, whenever any part is said to "include" or "comprise" any component, it is meant to be inclusive of other components, not exclusive of other components, unless specifically stated to the contrary. In addition, terms such as "~part," "module," and the like in the specification refer to a unit that handles at least one function or operation, which may be implemented in hardware or software or a combination of hardware and software. When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer readable media, as part of the apparatus.

In this specification, "sound source," "music," and "sound" have the same meaning and are used interchangeably.

In this specification, a push to talk (PTT) service refers to a service that allows transmission of speech messages by pressing a specific button for communication.

In this specification, a music prompt or a user prompt refers to changing a prompt, such as a user Beep sound or "Say a command" sound, that induces a user to utter a command for speech recognition, i.e., requests an input from the user, to a sound source selected or stored/recorded by the user to play the same.

Embodiments of the present disclosure may be applied to sound processing technology including user experience (UX) that provides users with an environment for using speech recognition in a vehicle.

The user environments to which an embodiment of the present disclosure may be applied are as follows.

① The user may set a "user prompt" and a "user background sound source" through applications that may connect to a vehicle (e.g., Blue Link, KIA Connect, and the like) or through setting of speech recognition of the vehicle.

② In the setting of the speech recognition of the vehicle, a default sound source provided by the vehicle may be selected.

③ Speech selection via an application may include a function of transmitting user-created and user-recorded sound sources by the user to the vehicle, including selection of a default sound source.

FIG. 1 is a block diagram of an apparatus for speech recognition according to an embodiment of the present disclosure.

Referring to FIG. 1, the apparatus for speech recognition according to an embodiment of the present disclosure may include a user prompt playback unit 101, a microphone detection signal extraction unit 102, a user prompt removal unit 103, a voice/speech recognition unit 104, a response output unit 105, and a controller 106. Although not shown in the drawings, the apparatus for speech recognition according to an embodiment of the present disclosure may include at least one microphone (MIC) capable of receiving a user's speech including a speech signal. The user prompt playback unit 101 plays a sound source previously selected by the user when the sound source recognition begins (PTT or wakeup).

In other words, the user prompt playback unit 101 may change a prompt, such as a user Beep sound or "Say a command" sound, that induces the user to utter a command for speech recognition to a sound source selected or stored/recorded by the user, as shown in a database of Table 1 to play the same.

TABLE 1

| DB-ID | User-selected sound source | Media properties |
|-------|---------------------------|------------------|
| 1 | Good New(Mac Milller) | Rd1(news) |
| 2 | Good weather (Sandol) | Rd2(weather) |
| 3 | Today's Fortune (Kim Hyung-joong) | Rd3(fortune) |
| 4 | Server-linked music source | Rdn(x) |
| 5 | Vivaldi Four Seasons (Spring) Classic | Mp |

The database of Table 1 may store sound sources in a variety of ways other than the sound sources selected or stored/recorded by the user and it is not limited to a specific format. The database may provide default music sources that may be uploaded from a terminal application or selected by the user. In addition, the user prompt playback unit 101 may select and use a plurality of music prompts for each user when changing the prompt that induces the user to utter for speech recognition to a sound source selected or stored/recorded by the user to play the same.

Methods of storing sound sources selected or stored/recorded by the user may include a method of sampling and using the user's favorite music, a method of recording narration by the user, and a method of creating and using the user's own prompts.

The user prompt playback unit 101 may provide a user-friendly utterance environment by allowing the user to change the prompt, such as the existing Beep sound or "Say the command" sound, that induces the user to utter for speech recognition to a sound source selected or stored/recorded by the user to use the same. By using these sound sources, the beginning and end of an utterance may be more accurately specified by changing the existing unspecific noise (wind noise or road noise) to a specific noise (user-selected sound source).

Since the sound source played by the user prompt playback unit 101 is a sound source already known to the vehicle and a time point of playback is accurately recognized, the sound source may be classified as a predictable noise different from general environmental noise and road noise.

When the microphone detection signal extraction unit 102 receives the user's utterance as a speech signal via the microphone of the vehicle, the microphone detection signal extraction unit 102 may extract a microphone detection signal (En+Mp+Vs) including wind noise or road noise En flowing into the vehicle, a "user prompt" (Mp), and an utterance (Vs) selected by a beginning of speech (BOS)/end of speech (EOS) extraction unit (not shown). The BOS/EOS extraction unit may extract a beginning or end point of the speaker's utterance. More specifically, the BOS/EOS extraction unit may monitor and determine a time point at which a sound of Mp input into the microphone is created as the beginning of speech BOS. If there is no speech detected for about 0.8 seconds (when the sound of Mp continues for 0.8 seconds or longer), the BOS/EOS extraction unit may determine that the end of speech EOS has been reached.

Since a music prompt is used, a noise (music prompt) input during speech recognition is already known. Therefore, the BOS and EOS may be measured more accurately when the user utters a command.

In addition, when there is a speech coming into the microphone, if an input having a different specific time point that is already known is introduced, it may be set as the BOS. When only a signal from the sound source is input to the microphone, it may be set as the EOS. Accordingly, a time point of the beginning of speech and a time point of the end of speech may be defined more accurately than using previous apparatus for speech recognition. Therefore, unnecessary waiting time (the time to wait to see if the user is not speaking) is reduced because the apparatus for speech recognition is not classifying unspecified noise and speech, but rather specific noise and speech, a determination time is bound to be fast. As a result, a faster speech recognition service is provided by the apparatus for speech recognition.

The microphone detection signal extraction unit 102 may provide a user-friendly utterance environment by allowing the user to change the prompt that induces the user to utter a command for speech recognition, such as an existing Beep sound or "Say the command," sound to a sound source selected or stored/recorded by the user to use the same.

The user prompt removal unit 103 may remove the user prompt from the microphone detection signal (En+Mp+Vs). Since the user prompt uses sound sources of the vehicle, the user prompt may be easily removed.

The speech recognition unit 104 may recognize a speech based on the value (En+Vs) from which the user prompt has been removed.

The response output unit 105 may transmit a response related to the speech to the terminal or server based on a result of the speech recognition by the speech recognition unit 104.

The controller 106 may control each of the user prompt playback unit 101, the microphone detection signal extraction unit 102, the user prompt removal unit 103, the speech recognition unit 104, the response output unit 105 for speech recognition according to an embodiment of the present disclosure.

The user prompt playback unit 101, the microphone detection signal extraction unit 102, the user prompt removal unit 103, the voice/speech recognition unit 104, the response output unit 105, and the controller 106 may be implemented by one or more hardware components of a computer system (i.e., a computer processor, a microprocessor) that performs the above-described operations.

Figure 2:
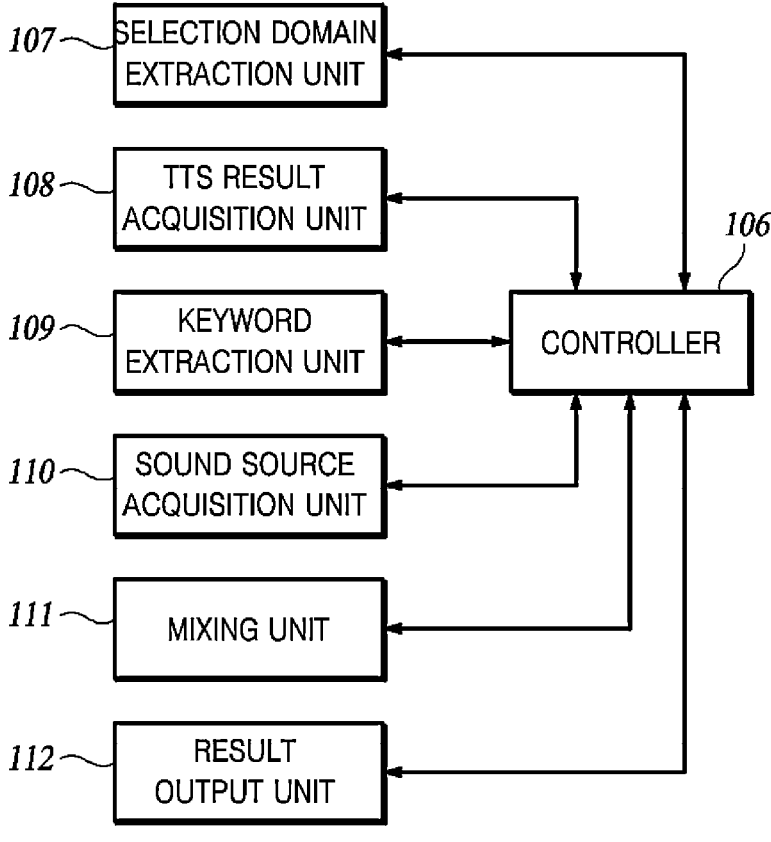
FIG. 2 is a block diagram of an apparatus for speech recognition according to another embodiment of the present disclosure.

FIG. 2 is a block diagram of an apparatus for speech recognition according to another embodiment of the present disclosure.

The apparatus for speech recognition according to another embodiment of the present disclosure may include a selection domain extraction unit 107, a text-to-speech (TTS) result acquisition unit 108, a keyword extraction unit 109, and a sound source acquisition unit 110, a mixing unit 111, and a result output unit 112 in addition to the components of FIG. 1.

The selection domain extraction unit 107 may extract a domain value (Rdn) and a speech recognition result value from the result of the speech recognition by the speech recognition unit 104.

The TTS result acquisition unit 108 may acquire a result value (Rt) output as text from the speech recognition result value of the selection domain extraction unit 107.

The speech recognition result may be achieved through execution of commands and transmission of information. Among these, in the case of a domain transferring the result as a TTS among the results corresponding to the transmission of information, the vehicle can provide an appropriate environment for information delivery by allowing the user to manually set background sounds (music, and the like) for each domain or may automatically set background sounds based on user experience (e.g., usage history, and the like), breaking away from the stiff information transmission method of transmitting only speech sounds.

The keyword extraction unit 109 may extract a keyword from the result value (Rt) output as text and transmit the extracted keyword to the server.

The sound source acquisition unit 110 may acquire a sound source Rdn(x) corresponding to the keyword extracted from the server. A recommended sound source corresponding to the keyword may be extracted from the server and may be stored in the database of Table 1 as Rdn(x).

The sound source acquisition unit 110 may acquire a background sound for each domain from the database of Table 1 in the case of a domain having the result value (Rt) output as text from the result of recognizing the speech.

The mixing unit 111 may mix the sound source Rdn(x) corresponding to the keyword extracted from the server, the user prompt (Mp), and the result value (Rt) output as text, and output the same. Media sources set for each domain may be selected based on a domain value, as shown in the database of Table 1.

The result output unit 112 may output the result value of the mixing unit 111.

The controller 106 of FIG. 1 may control each of the selection domain extraction unit 107, the TTS result acquisition unit 108, the keyword extraction unit 109, the sound source acquisition unit 110, the mixing unit 111, the result output unit 112, and the like for speech recognition according to an embodiment of the present disclosure.

The selection domain extraction unit 107, the TTS result acquisition unit 108, the keyword extraction unit 109, the sound source acquisition unit 110, the mixing unit 111, the result output unit 112 may be implemented by one or more hardware components of a computer system (i.e., a computer processor, a microprocessor) that performs the above-described operations.

Figure 3:
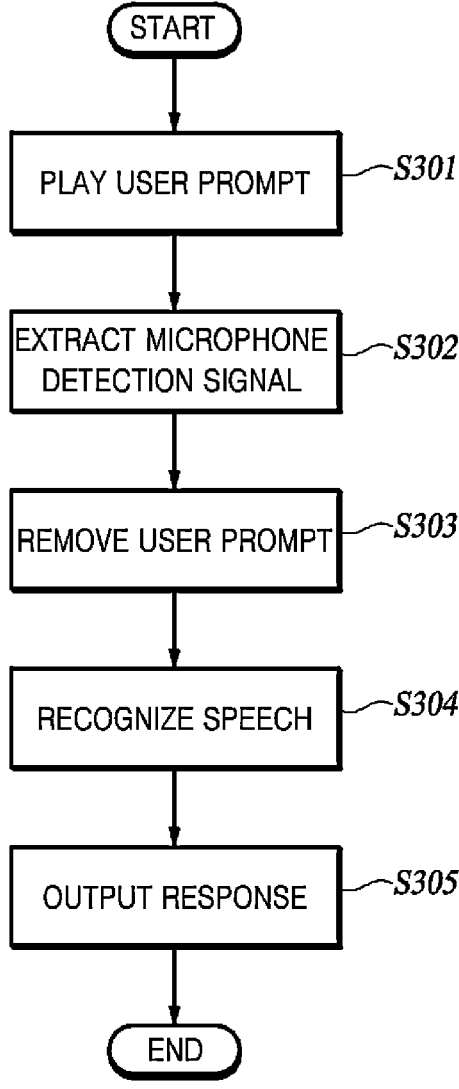
FIG. 3 is an operation flowchart of an apparatus for speech recognition according to an embodiment of the present disclosure.

FIG. 3 is an operation flowchart of an apparatus for speech recognition according to an embodiment of the present disclosure.

The apparatus for speech recognition plays a sound source selected by the user at a time point (PTT or wakeup) when sound source recognition begins in step S301. In other words, the apparatus for speech recognition may change the prompt, such as a user Beep sound or "Say a command" sound that induces the user to utter a command for speech recognition to a sound source selected or stored/recorded by the user to play the same, as shown in a database of Table 1 to play the same.

In step S302, when the apparatus for speech recognition receives the user's utterance as a speech signal through the microphone of the vehicle, the apparatus for speech recognition may extract a microphone detection signal (En+Mp+Vs) including wind noise or road noise (En) flowing into the vehicle, a "user prompt" (Mp), and an utterance (Vs) selected by a BOS/EOS extraction unit (not shown). The BOS/EOS extraction unit may extract a beginning or end point of the speaker's utterance. More specifically, the BOS/EOS extraction unit may monitor and determine a time point at which a sound of Mp input into the microphone is created as the beginning of speech (BOS). If there is no speech detected for about 0.8 seconds (when the sound of Mp continues for 0.8 seconds or longer), the BOS/EOS extraction unit may determine that the end of speech (EOS) has been reached. The content of the utterance (Vs) may be expressed as Equation 1 and may include the content of the speech from the beginning of the speech to the end of the speech.

$$Vs(speech)content=BOS(t){\sim}EOS(t) \qquad \text{[Equation 1]}$$

The apparatus for speech recognition may remove the user prompt from the microphone detection signal (En+Mp+Vs) in step S303.

The apparatus for speech recognition may recognize a speech based on the value (En+Vs) from which the user prompt is removed in step S304.

The apparatus for speech recognition may transmit a response related to the speech to the terminal or server based on the result of recognizing the speech in step S305.

Figure 4:
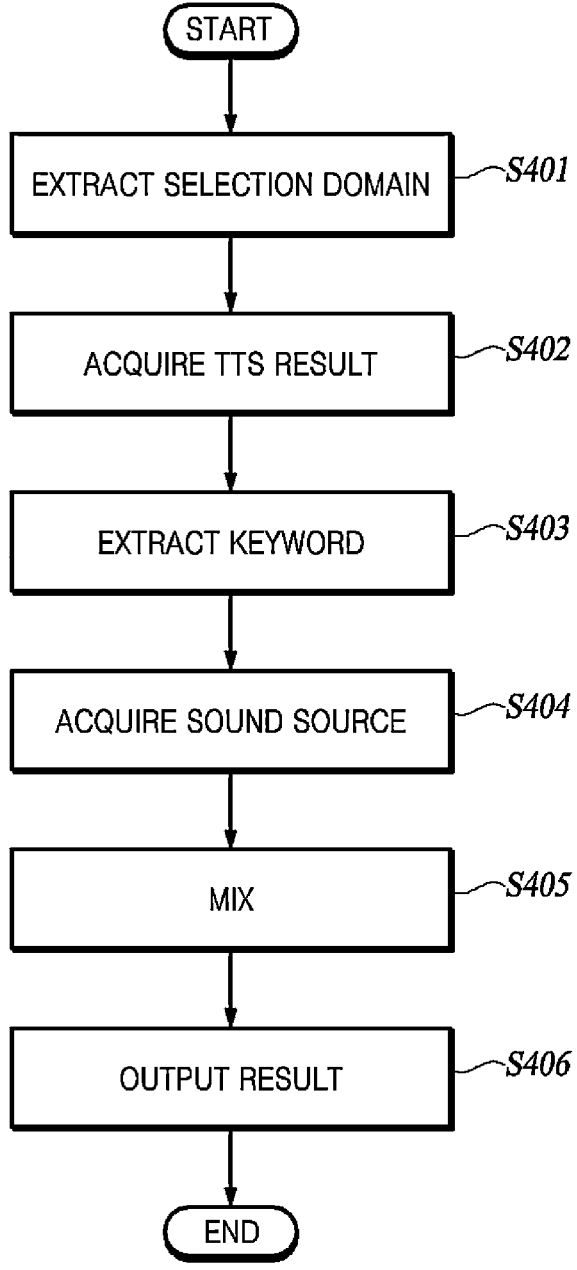
FIG. 4 is an operation flowchart of an apparatus for speech recognition according to another embodiment of the present disclosure.

FIG. 4 is an operation flowchart of an apparatus for speech recognition according to another embodiment of the present disclosure.

After step S305 of FIG. 3, the apparatus for speech recognition may extract a domain value (Rdn) and a speech recognition result value from the speech recognition result in step S401.

The apparatus for speech recognition may acquire a result value (Rt) output as text from the speech recognition result value in step S402.

The apparatus for speech recognition may extract a keyword from the result value (Rt) output as text in step S403 and transmit the extracted keyword to the server.

The apparatus for speech recognition may acquire a sound source Rdn(x) corresponding to the keyword extracted from the server in step S404. A recommended sound source corresponding to the keyword extracted from the server may be stored in the database of Table 1 as Rdn(x).

The apparatus for speech recognition may mix the sound source (Rdn(x)) corresponding to the keyword extracted from the server, the user prompt (Mp), and the result value (Rt) output as text and output the same in step S405. Media sources set for each domain may be selected based on a domain value, as shown in the database of Table 1.

The apparatus for speech recognition may output the mixed result value in step S406.

The operation of FIG. 4 is further described as follows.

In the case of a domain with (Rt), a method may include selecting a background sound for each domain from the database of Table 1.

The method of selecting a background sound includes a method of selecting from a default sound source or a method of sending a sound source created/downloaded/purchased by the user to the server to be downloaded and used in the vehicle.

As mentioned above, in addition to the method of selecting the background sound by the user, a method may include providing a random option to store multiple sound sources for each domain and using them randomly. Alternatively, in the case of a weather domain, a method may include extracting the type of weather from text and extracting a background sound source suitable for the weather. In the case of the weather domain, a value for the type of weather (this value may also be used to display a weather icon in the vehicle) may be used. When the type of weather result is "a little rain", background music that matches the weather result may be searched from a streaming server and downloaded to be played immediately. For example, in the case of receiving an utterance "Tell me about the results of the baseball game," a keyword "baseball" may be extracted and sent to a music server. A sound source that matches "baseball" may be searched and sent to the vehicle. A background sound source may be stored so that the corresponding sound source may be mixed with the baseball results and output.

By adding users' tastes and preferences, the embodiments of the present disclosure provide users with a perception that speech recognition is a technology that may be conveniently used. With increase in usability, various speech patterns may be collected and reflected in recognition performance, thereby achieving an efficacious development cycle structure.

In the drawings described above, even though the processes are described as being sequentially executed, the processes merely illustrate the technical spirit of some embodiments of the present disclosure. In other words, a person having ordinary skill in the art to which various embodiments of the present disclosure pertain may variously modify and apply the present disclosure by changing and executing the processes described in the flowchart or executing one or more of the processes in parallel without departing from an intrinsic characteristic of some embodiments of the present disclosure. Thus, the drawings are not limited to a time-series sequence.

The processes shown in FIGS. 3 and 4 may be implemented as computer-readable codes on a non-transitory computer-readable recording medium. The computer-readable recording medium may include all types of recording devices that store data that may be read by a computer system. That is, such computer-readable recording medium includes non-transitory mediums, such as ROM, RAM, CD-ROM, magnetic tape, floppy disk, and optical data storage devices. In addition, computer-readable recording mediums may be distributed to a computer system connected by a network and computer-readable code may be stored and executed in a distributed manner.

In addition, the components of the present disclosure may use integrated circuit structures, such as a memory, a processor, a logic circuit, a look-up table, and the like. These integrated circuit structures execute each function described herein via control of one or more microprocessors or other control devices. In addition, the components of the present disclosure may be specifically implemented by a program or portion of code that includes one or more computer executable instructions for performing specific logical functions and is executed by one or more microprocessors, processors, or other control devices. In addition, the components of the present disclosure may include or be implemented by a central processing unit (CPU), a microprocessor, and the like, that performs the respective functions thereof. In addition, the components of the present disclosure may store instructions executed by one or more processors in one or more memories.

What is claimed is:

1. An apparatus for speech recognition, the apparatus comprising:
    a user prompt playback unit configured to change a user prompt that induces utterance for speech recognition into a sound source and play the sound source;
    a microphone detection signal extraction unit configured to extract a microphone detection signal when a speech of a user is received as a speech signal through a microphone;
    a user prompt removal unit configured to remove the user prompt from the microphone detection signal;
    a speech recognition unit configured to recognize a speech based on a value from which the user prompt is removed;

a response output unit configured to output a response related to the speech based on a result of recognizing the speech;

a selection domain extraction unit configured to extract a domain value (Rdn) and a speech recognition result value from the result of recognizing the speech;

a text-to-speech (TTS) result acquisition unit configured to acquire a result value (Rt) output as text from the speech recognition result value;

a keyword extraction unit configured to extract a keyword from the result value (Rt) and transmit the extracted keyword to a server;

a sound source acquisition unit configured to acquire a sound source (Rdn(x)) corresponding to the keyword extracted from the server;

a mixing unit configured to mix a sound source (Rdn(x)) corresponding to the keyword extracted from the server, the user prompt (Mp), and the result value (Rt); and a result output unit configured to output a mixed result, wherein the sound source acquisition unit is further configured to acquire, from a database, a background sound corresponding to a domain value (Rdn) output from the speech recognition result, wherein the microphone detection signal includes a user prompt (Mp), a noise (En) introduced into a vehicle, and speech (Vs) contents, and wherein the speech (Vs) contents include speech data identified as beginning-of-speech (BOS) based on an input signal differing from a predetermined sound source pattern being detected and include speech data identified as end-of-speech (EOS) based on only the predetermined sound source pattern being detected.

2. The apparatus of claim 1, wherein the noise (En) introduced into the vehicle includes at least one of a wind noise or a road noise.

3. The apparatus of claim 1, wherein the sound source corresponding to the domain is pre-stored in the database.

4. The apparatus of claim 1, wherein the background sound is acquired by mapping a user-selected sound or a sound stored or recorded using a user terminal to an identifier of the database.

5. A method for speech recognition, the method comprising:

changing a user prompt that induces utterance for speech recognition into a sound source and playing the sound source;

extracting a microphone detection signal when a speech of a user is received as a speech signal through a microphone;

removing the user prompt from the microphone detection signal;

recognizing a speech based on a value from which the user prompt is removed;

outputting a response related to the speech based on a result of recognizing the speech;

extracting a domain value (Rdn) and a speech recognition result value from the result of recognizing the speech;

acquiring a result value (Rt) output as text from the speech recognition result value;

extracting a keyword from the result value (Rt) output as text and transmitting the extracted keyword to a server;

acquiring a sound source (Rdn(x)) corresponding to the keyword extracted from the server;

mixing the sound source Rdn(x) corresponding to the keyword extracted from the server, the user prompt (Mp), and the result value (Rt) output as text; and outputting a mixed result, wherein acquiring the sound source Rdn(x) further includes acquiring, from a database, a background sound corresponding to a domain value (Rdn) output from the speech recognition result, wherein the microphone detection signal includes a user prompt (Mp), a noise (En) introduced into a vehicle, and speech (Vs) contents, and wherein the speech (Vs) contents include speech data identified as beginning-of-speech (BOS) based on an input signal differing from a predetermined sound source pattern being detected and include speech data identified as end-of-speech (EOS) based on only the predetermined sound source pattern being detected.

6. The method of claim 5, wherein the noise (En) introduced into the vehicle includes at least one of wind noise or road noise.

7. The method of claim 5, wherein the sound source corresponding to the domain is pre-stored in the database.

8. The method of claim 5, wherein the background sound is acquired by mapping a user-selected sound or a sound stored or recorded using a user terminal to an identifier of the database.

9. A non-transitory computer-readable recording medium, which stores a computer program including computer-executable instructions configured to be executable by an apparatus for speech recognition including a processor, to cause the processor to execute:

a function including changing a user prompt that induces utterance for speech recognition into a sound source and playing the sound source;

a function including extracting a microphone detection signal when a speech of a user is received as a speech signal through a microphone;

a function including removing the user prompt from the microphone detection signal;

a function including recognizing a speech based on a value from which the user prompt is removed;

a function including outputting a response related to the speech based on a result of recognizing the speech;

a function including extracting a domain value (Rdn) and a speech recognition result value from the result of recognizing the speech;

a function including acquiring a result value (Rt) output as text from the speech recognition result value;

a function including extracting a keyword from the result value (Rt) and transmit the extracted keyword to a server;

a function including acquiring a sound source (Rdn(x)) corresponding to the keyword extracted from the server;

a function including mixing a sound source (Rdn(x)) corresponding to the keyword extracted from the server, the user prompt (Mp), and the result value (Rt); and a function including outputting a mixed result, wherein the function of acquiring a sound source (Rdn(x)) further comprises acquiring, from a database, a background sound corresponding to a domain value (Rdn) output from the speech recognition result, wherein the microphone detection signal includes a user prompt (Mp), a noise (En) introduced into a vehicle, and speech (Vs) contents, and wherein the speech (Vs) contents include speech data identified as beginning-of-speech (BOS) based on an input signal differing from a predetermined sound source pattern being detected and include speech data identified as end-of-speech (EOS) based on only the predetermined sound source pattern being detected.

10. The computer-readable recording medium of claim 9, wherein the noise (En) introduced into the vehicle includes at least one of wind noise or road noise.

11. The computer-readable recording medium of claim 9, wherein the background sound is acquired by mapping a user-selected sound or a sound stored or recorded using a user terminal to an identifier of the database.

\* \* \* \* \*